(12) United States Patent
Weaver

(10) Patent No.: US 6,170,372 B1
(45) Date of Patent: Jan. 9, 2001

(54) DUAL SPRING HOLD DOWN FOR WOOD WORKING TOOLS

(76) Inventor: Richard A. Weaver, 5326 Lowell, Overland Park, KS (US) 66202

( * ) Notice: Under 35 U.S.C. 154(b), the term of this patent shall be extended for 0 days.

(21) Appl. No.: 09/217,651

(22) Filed: Dec. 21, 1998

(51) Int. Cl.[7] .............................. B27B 25/06; B27B 27/00
(52) U.S. Cl. ................. 83/477; 83/421; 83/431; 83/438; 83/440.2; 83/450; 83/477.2; 83/DIG. 1; 144/253.1; 144/250.12; 144/251.1; 144/286.1; 269/58; 269/317
(58) Field of Search ........................ 83/421, 422, 438, 83/440, 440.2, 443, 444, 446, 447, 477.2, 478, 420, 425, 450, DIG. 1, 431; 144/251.1, 250.12, 253.1, 253.6, 286.1; 407/115; 269/36, 315, 303, 318, 55, 58, 317

(56) References Cited

U.S. PATENT DOCUMENTS

| | | | |
|---|---|---|---|
| 2,100,455 | * 11/1937 | Souther et al. | 83/422 X |
| 2,155,730 | * 4/1939 | Miller | 83/422 X |
| 2,642,902 | * 6/1953 | Carey | 144/250.18 |
| 4,026,173 | 5/1977 | Livick . | |
| 4,351,459 | * 9/1982 | Huey-Miin | 83/422 X |
| 4,481,846 | * 11/1984 | Goodell | 83/477.2 X |
| 4,603,612 | 8/1986 | Atkins . | |
| 5,181,447 | * 1/1993 | Hewitt | 83/DIG. 1 X |
| 5,205,198 | 4/1993 | Foray et al. . | |

* cited by examiner

Primary Examiner—Rinaldi I. Rada
Assistant Examiner—Boyer Ashley
(74) Attorney, Agent, or Firm—Shughart Thomson & Kilroy P.C.

(57) ABSTRACT

A dual spring hold down for use with wood working tools, such as table saws, routers and shapers comprises a bracket mounted on the wood working table behind the tool and a hold down bar pivotably attached to the bracket with the hold down bar surrounding the wood working tool. A threaded rod is threaded into and extends upward from an extension arm of the bracket and though a slot in a hold down bar cross plate. A first coil spring surrounds the threaded rod immediately above the cross plate and a second, stronger coil spring surrounds the threaded rod above the first coil spring while a cylindrical sleeve surrounds the first coil spring. The hold down bar is free to drop down to act as a safety barrier when no wood panel is present. Then, initial lifting of the hold down bar by a wood panel is initially against the relatively light downward bias of the first coil spring until the sleeve is lifted to a "hold down height" at a point sufficient to compress the first coil spring within the sleeve. Further lifting of the hold down bar is then against the considerably stronger downward bias of the second coil spring which provides the hold down bias. The hold down height of the hold down bar is adjustable by threading the threaded rod upward or downward.

17 Claims, 3 Drawing Sheets

DUAL SPRING HOLD DOWN FOR WOOD WORKING TOOLS

FIELD OF THE INVENTION

The present invention relates to a dual spring hold down for a wood working tool such as a table saw, shaper or router, and, more particularly, to such a hold down which attaches to a table and which is positioned to securely hold a wood panel as it is being shaped and to act as a barrier to minimize the operator's exposure with the working tool. The inventive hold down is adjustable for different thicknesses of wood stock, and includes a hold down bar which drops down into contact with the table surface, guide or depth stop position when no wood stock is present, but which easily lifts to a height just below the stock thickness to facilitate placement of the wood panel beneath the hold down for wood working operations.

BACKGROUND OF THE INVENTION

Designers and manufacturers of professional wood working tools, such as table saws, routers and shapers, are constantly looking for ways to improve the efficiency and safety of their products. One improvement which has been widely adopted is the use of "hold downs" which are spring loaded bars or blocks which provide downward pressure on a wood panel as it is being pushed or pulled past a saw blade, router or shaper. One example of such a hold down is illustrated and described in U.S. Pat. No. 4,063,612 to Richard Atkins. In the Atkins patent, a housing includes a pair of legs which straddle a rip fence and a spring biased hold down arm is attached to the housing and extends downward at an angle therefrom to engage a wood panel being cut by a table saw. The housing can be pushed along the rip fence to urge the wood panel into the saw blade while keeping the operator's fingers clear.

Another example of a hold down is illustrated and described in U.S. Pat. No. 4,026,173 to Livick. In the Livick patent, again, the hold down device is attached to and is movable along a rip fence so that an operator's hand are kept clear of the saw blade.

Hold downs are also known which attach to a shaper work table andiextend over the shaper blade to engage a wood panel being shaped. An example of such a hold down, which is offered on the assignee's machines, is illustrated in FIG. 1, labeled as "PRIOR ART". The hold down of FIG. 1 which is described in detail below, includes a U-shaped bar which fits over the shaper blade and which is spring biased downward by a coil spring to apply downward pressure against a wood panel being shaped. The working height of the hold down is adjustable via a crank arm to allow for different thicknesses of wood panels.

The rip fence mounted hold downs of Livick and Atkins are suitable for use with table saws equipped with rip fences, but not with shapers or routers, and not for sawing lumber of a width such that it will not fit within a rip fence. Assignee's prior art hold down design, as represented in FIG. 1, has worked satisfactorily as a hold down, but, particularly for wood panels of larger thicknesses, does not provide as effective of a barrier for minimizing the exposure of an operator to a working tool.

It is clear, then, that a need exists for an improved hold down device for use with wood working tools, such as table saws, routers and shapers. Such an improved hold down should provide downward pressure against a wood panel being shaped or cut and should allow an operator to feed the wood panel through the wood working tool while minimizing the exposure of the operator to the operating tool. Finally, such a hold down should be easily adjustable to accommodate different thicknesses of wood stock.

SUMMARY OF THE INVENTION

The present invention is directed to a hold down for use with wood working tools, such as table saws, routers and shapers. The inventive hold down includes a base with a flat plate which is removably secured to the wood working table behind the tool and which forms a part of a bracket including opposing side plates connected by a bracket cross plate. Each bracket side plate has a slot extending there through and a rigid bracket extension arm is attached to and extends outward from the bracket cross plate. A hold down mechanism includes a pair of hold down legs which are sized to go on respective sides of the wood working tool and each hold down leg is bolted through a respective slot of one of the bracket side plates such that the hold down legs are pivotable relative to the bracket. A hold down cross plate connects between the two hold down legs behind the wood working tool and the hold down cross plate includes a slot extending there through. A hold down bar connects between the two hold down legs arms in front of the wood working tool. An externally threaded rod is threaded into and extends upward from a threaded bore in the rigid bracket arm and through the slot in the hold down cross plate where a first washer is positioned. A first coil spring surrounds the threaded rod immediately above the first washer and extends upward to a second washer and a second coil spring surrounds the threaded rod above the second washer and extends upward to a third washer. A cylindrical sleeve surrounds the first coil spring, with the sleeve being somewhat shorter than an extended length of the first coil spring. The first coil spring is of considerably smaller gauge, and is thus quite a bit weaker, than the second coil spring. The hold down bar is free to drop down to the table surface, guide, or position of depth stop when not in use. Then, initial lifting of the hold down bar by a wood panel is against the relatively light downward bias of the first coil spring until the sleeve is lifted a distance sufficient to compress the first coil to the length of the surrounding sleeve, i.e. until the top of the sleeve contacts the second washer at a hold down height. Further lifting of the hold down bar is then against the considerably stronger downward bias of the second coil spring as the sleeve pushes upward against the second washer. It is the second, larger gauge coil spring which provides most of the hold down pressure against the wood panel. The hold down height of the hold down bar is adjustable by threading the threaded rod upward or downward. A first embodiment of hold down mechanism is designed for use with raised panel shapers while a second embodiment is designed for use with table saws and the like.

OBJECTS AND ADVANTAGES OF THE INVENTION

The objects and advantages of the invention include: providing an improved hold down for wood working tools; providing such an improved hold down which greatly reduces the exposure of the wood working tool and applies the proper pressure to a wood panel as it is being fed through a wood working tool; providing such a hold down which uses a first coil spring surrounding a threaded shaft connected to a hold down bracket arm, which first coil spring is surrounded by a cylindrical sleeve such that the first coil spring provides a minimal downward bias against a hold down bar until the hold down bar has been lifted to a preset hold down height; providing such an improved hold down with a second, larger gauge coil spring positioned above the first coil spring and surrounding sleeve on the threaded shaft which second coil spring provides a significant downward bias against the wood panel secured beneath the hold down bar after the hold down bar has been raised to the hold down height; providing such a hold down in which the hold down height is conveniently adjustable; and providing such a hold down which is economical and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
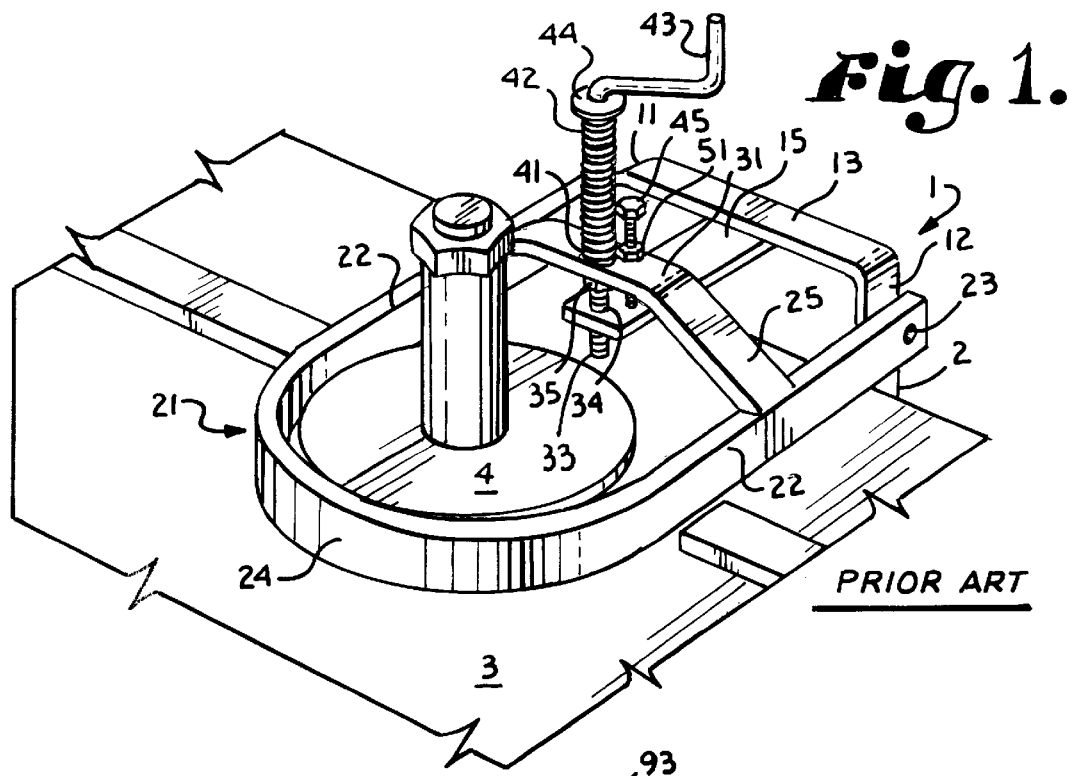
FIG. 1 is a perspective view of a portion of a wood working shaper table equipped with a prior art spring biased raised panel hold down.

Referring to the drawings, and particularly to FIG. 1, a prior art spring biased raised panel hold down is illustrated and generally indicated at 1. The prior art hold down 1 includes a bracket 2 which is removably bolted to a wood working table 3 behind a shaper cutter blade 4. The bracket 2 includes opposing bracket side plates 11 and 12 connected by a bracket cross plate 13. Each bracket side plate 11 and 12 has a corresponding bore (not shown) extending there through. A rigid bracket extension arm 15 is attached to and extends outward from the bracket cross plate 13. A hold down mechanism in this embodiment is a U-shaped hold down bar 21 including a pair of hold down legs 22 which are of a length and separated sufficiently to surround the shaper cutter 4 and each of the hold down legs 22 is bolted through a respective one of the bores in one of the bracket side plates 11 and 12 via respective bolts 23 such that the hold down bar 21 is pivotable relative to the bracket 2. The hold down bar 21 includes an arcuate section 24 which extends in front of the shaper cutter 4 and a hold down cross plate 25 is attached, at either end thereof, to the respective top of each hold down leg 22. The cross plate 25 is bent upward such that it extends upward from either hold down leg 22 and includes a horizontal segment 31 with a vertical bore extending there through. An externally threaded rod 33 is threaded into and extends upward from a threaded bore 34 in the bracket extension arm 15 and through a slot (not shown) in the hold down cross plate 25. A pair of locking nuts 35 (only one of which is seen in FIG. 1) are threaded onto the rod 33 between the slot and the extension arm 15 and a washer 41 is positioned above the cross plate 25. A coil spring 42 surrounds the threaded rod 33 immediately above the washer 41. The threaded rod 33 is bent outward and upward at the top thereof to form an angled handle 43 and a second washer 44 surrounds the rod 33 immediately below the handle 43 and immediately above the spring 42. The washer 44 can be welded to the rod 33. As the handle 43 is turned, the height of the hold down bar 21 above the surface of the table 3 is adjusted up or down. This allows the prior art hold down 1 to be adjusted for different thicknesses of wood stock. For example, for wood stock of a nominal 1.5" thickness, the hold down bar 21 would be adjusted via the handle 43 to a height slightly less than 1.5", e.g. about 1.4" or so. The right side of the hold down bar 21 is preferably tapered inward which allows wood stock being fed into the shaper cutter 4 to lift the hold down bar 21 the remaining 0.1" or so against the action of the coil spring 42 without marring or damaging the wood surface. The correct height of the hold down bar 21 can be preselected by a threaded stop limit rod 45, which stop limit rod 45 extends through a threaded bore in the hold down cross plate 25 and extends downward therefrom. The stop limit rod 45 is adjustable up or down by loosening a nut 51 and can include indicia (not shown) which allows an operator to visually preselect hold down bar height by the setting of the stop limit rod 45. Then, in order to accurately set the hold down bar height, the handle 43 is turned clockwise, threading the rod 33 downward until the top of the bracket extension arm 15 contacts the bottom of the stop limit rod 45.

The prior art hold down 1 works well as a hold down but could make a better barrier for minimizing exposure of the shaper cutter 4 to an operator. This is a particular problem for thicker wood stock where the height setting for the hold down bar 21 is ¾" or greater. It is this problem that the present invention is designed to address.

Figure 2:
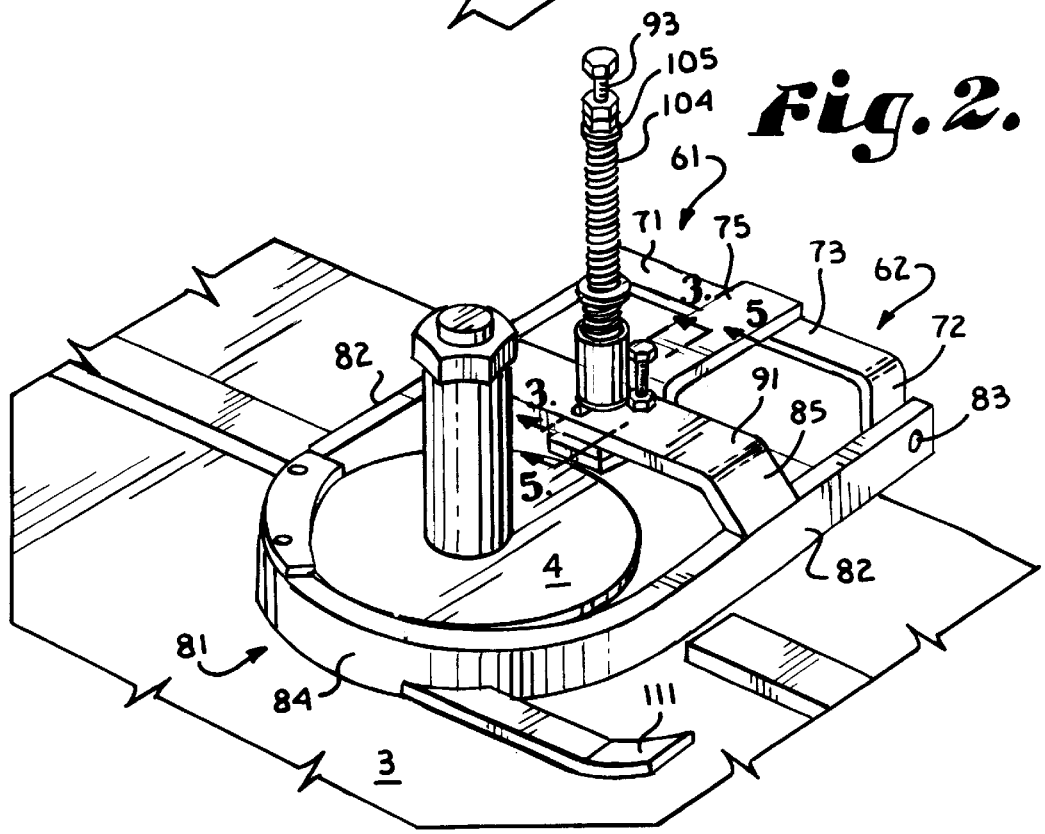
FIG. 2 is a perspective view of a portion of the wood working shaper table equipped with a spring biased raised panel hold down in accordance with the present invention.
Figure 3:
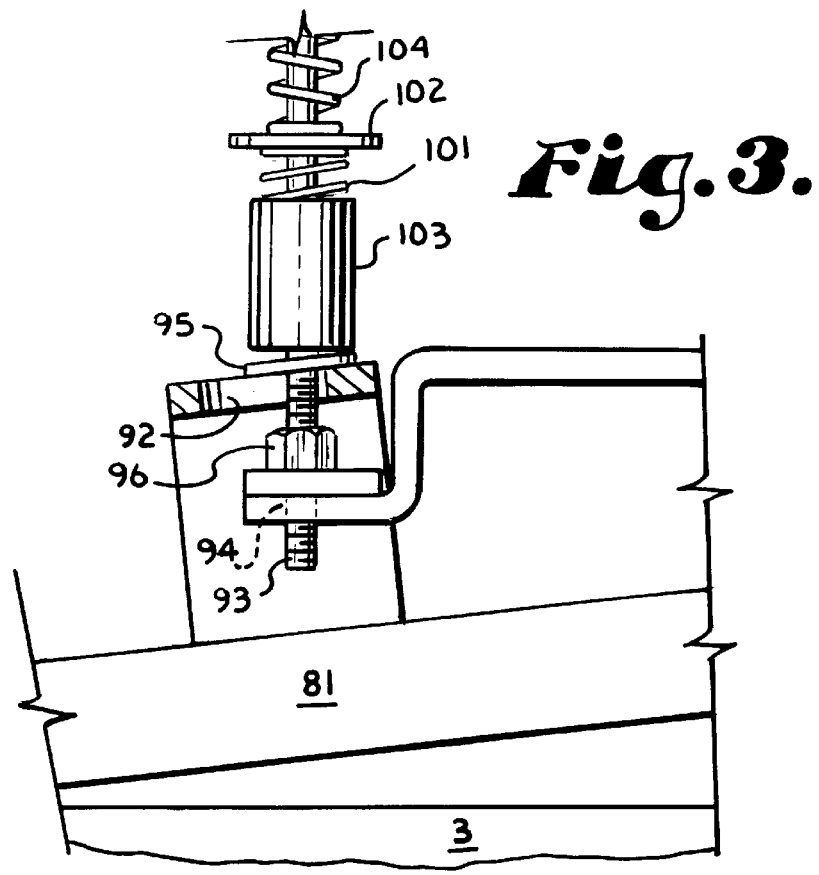
FIG. 3 is a greatly enlarged, fragmentary cross sectional view of the inventive raised panel hold down, taken along line 3—3 of FIG. 2, and showing details of the spring biasing hold down mechanism and showing the hold down bar in a down position.
Figure 4:
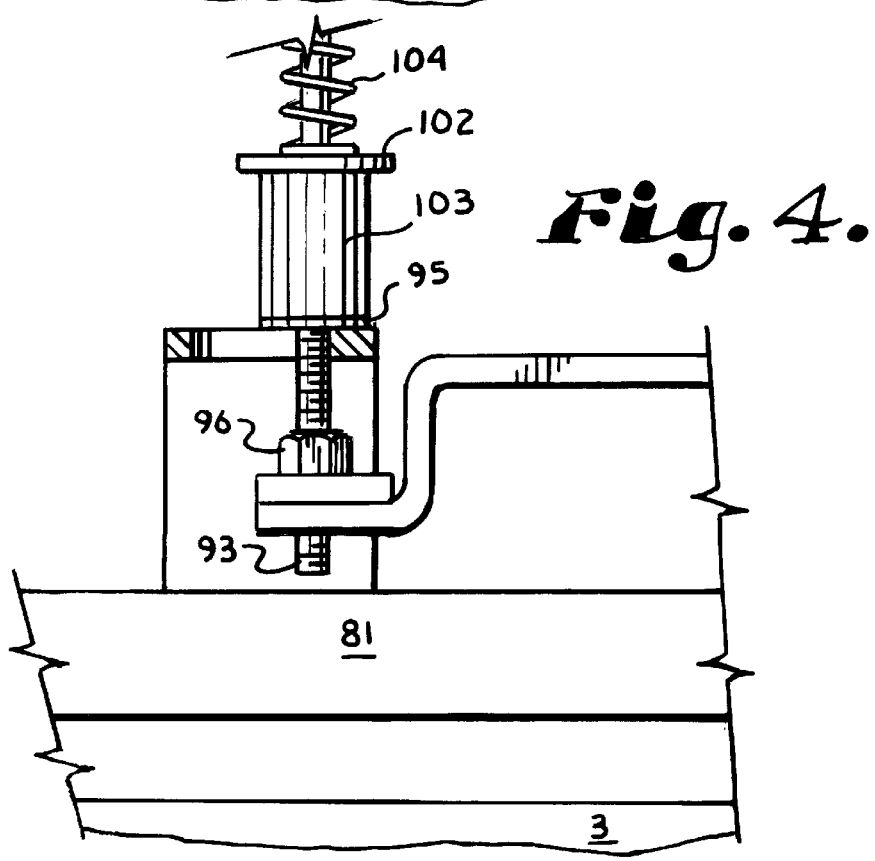
FIG. 4 is a greatly enlarged, fragmentary cross sectional view of the inventive raised panel hold down, also taken along line 3—3 of FIG. 2, and showing details of the spring biasing hold down mechanism and showing the hold down bar in a position raised to a hold down height, i.e. sufficiently for the second coil spring to provide a downward hold down bias against it.
Figure 5:
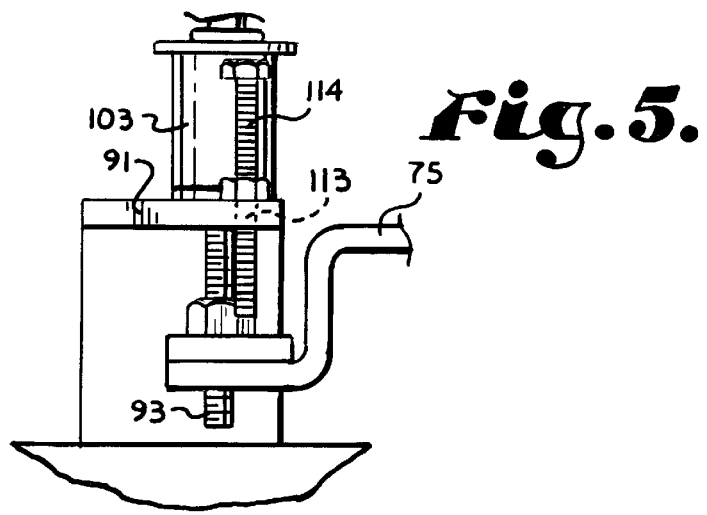
FIG. 5 is a greatly enlarged, fragmentary cross sectional view of the a portion of the inventive raised panel hold down, taken along line 5—5 of FIG. 2, and showing details of a threaded stop limit rod set to limit the extent of drop of the hold down bar.

Referring to FIGS. 2–4, an improved hold down in accordance with the present invention is generally indicated at 61. The improved hold down is similar in many respects to the prior art hold down 1 of FIG. 1 and much of the following description will mirror the above description for the prior art hold down 1.

The inventive hold down 61 includes a bracket 62 which is removably bolted to a wood working table 3 behind a shaper cutter blade 4. The bracket 62 includes opposing bracket side plates 71 and 72 connected by a bracket cross plate 73. Each bracket side plate 71 and 72 has a corresponding slot extending there through. A rigid bracket extension arm 75 is attached to and extends outward from the bracket cross plate 73. A hold down mechanism in this embodiment is a U-shaped hold down bar 81 including a pair of hold down legs 82 which are of a length and separated sufficiently to surround the shaper cutter 4 and each of the hold down legs 82 is bolted through a respective one of the slots of one of the bracket side plates 71 and 72 via respective bolts 83 such that the hold down bar 81 is pivotable relative to the bracket 62. The hold down bar 81 includes an arcuate section 84 which extends in front of the shaper cutter 4 and a hold down cross plate 85 is attached, at either end thereof, to the respective top of each hold down leg 82. The cross plate 85 is bent upward such that it extends upward from either hold down leg 82 and includes a horizontal segment 91 with a vertical slot 92 extending there through. An externally threaded rod 93 is threaded into and extends upward from a threaded bore 94 in the bracket extension arm 75 through the slot 92 and a first washer 95 (FIG. 3) is positioned around the rod 93 just above the slot 92. A securing nut 96 is threaded onto the rod 93 just above the threaded bore 94 to secure the rod in a set vertical position relative to the threaded bore 94. A first coil spring 101 surrounds the threaded rod 93 above the first washer 95 and extends upward to a second washer 102. A cylindrical sleeve 103 surrounds the first coil spring 101 between the first and second washers 95 and 102, respectively and a second coil spring 104 surrounds the threaded rod 93 above the second washer 102 and extends upward to a third washer 105. The first coil spring 101 is of considerably smaller gauge, and thus quite a bit weaker, than the second coil spring 104. Since there is no nut positioned on the rod 93 below the slot 92 in the cross plate segment 91, the hold down bar 81 is free to drop all the way to the surface of the table 3, or to a guide (not shown) or to the extent of a depth stop 114 (described below) as shown in FIG. 3. In this down position, the hold down bar 81 functions as an effective barrier to prevent an operator's fingers from being accidently slid under the hold down bar 81 and into contact with the shaper cutter 4. A curved shoe 111 is attached to and extends outward and upward from the right side of the hold down bar 81. As a wood panel (not shown) is placed on the right side of the surface of the table 3 and pushed to the left, it first encounters the shoe 111, causing the shoe 111 to lift the hold down bar 81 against the relatively weak action of the first coil spring 101 to a point at which the top of the sleeve 103 is in contact with the second washer 102 while the bottom of the sleeve 103 is in contact with the first washer 95. In other words, at this height, as shown in FIG. 4, termed the "hold down height", the first coil spring 101 is fully contained with the length of the sleeve 103. At the hold down height, any further upward motion of the hold down bar 81 is against the downward bias of the second coil spring 104 so the last fraction of an inch of lift of the hold down bar 81 by the wood panel is against the bias of the second spring 104. Thus, at and above the hold down height, the hold down bias of the mechanism 61 is provided by the second, larger gauge coil spring 104. Height adjustment of the hold down height to accommodate different thicknesses of wood stock is provided in much the same way as described earlier, i.e. once the securing nut 96 is loosened, the threaded rod 93 is turned clockwise to lower the hold down height, and is turned counterclockwise to raise the hold down height. Although not shown, in order to facilitate adjustment, the threaded rod 93 can be bent to include a handle, such as the handle 43 illustrated in FIG. 1.

Again, the hold down height should be adjusted to be just slightly less than the thickness of the wood stock being worked.

Referring to FIGS. 2 and 4, a threaded bore 113 is provided in the cross plate segment 91 with the bore 113 being positioned and sized to receive a depth stop rod 114 which is threaded there through. The depth stop rod 114 is used, when necessary, to limit the distance which the hold down bar 81 is allowed to drop. In other words, by turning the depth stop rod 114 clockwise until it engages the bracket extension arm 75, the hold down bar 81 can be stopped just off of the surface of the table 3. This is useful, for example, where a particularly soft type of wood is being worked, or where an operator does not want the hold down bar 81 to clang against the table 3.

Figure 6:
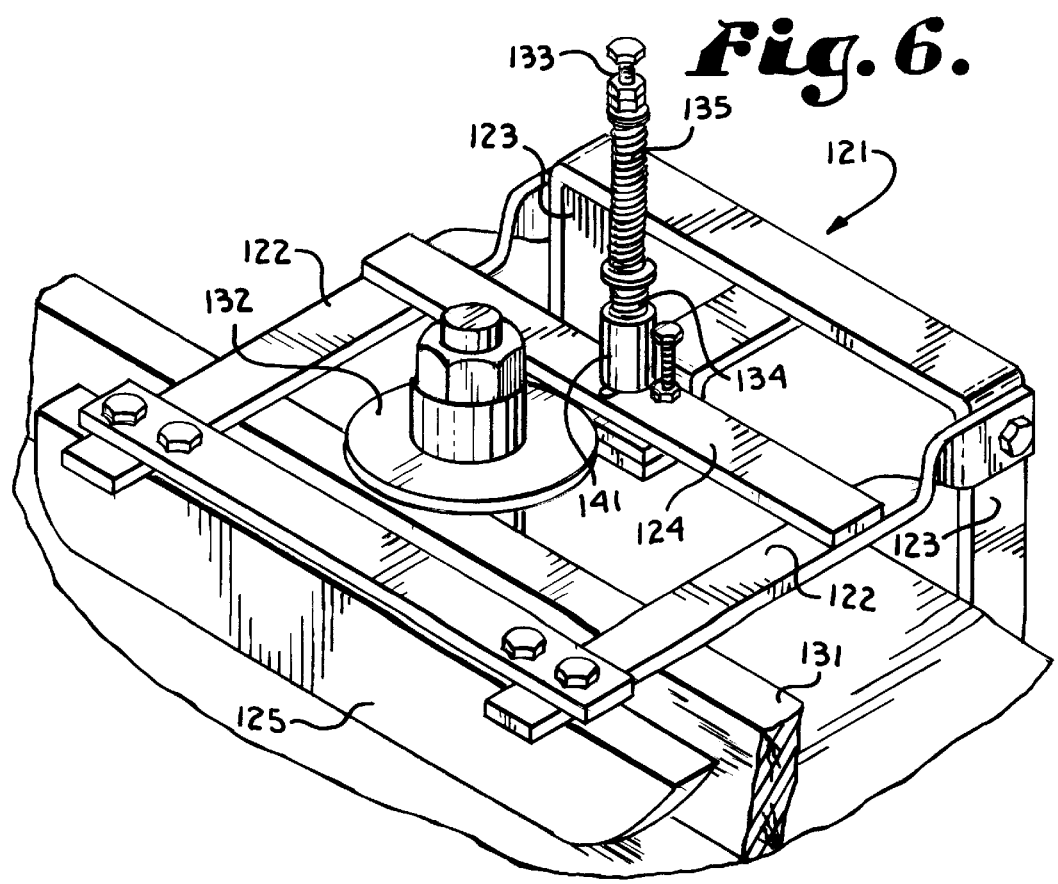
FIG. 6 is a perspective view of a portion of a wood working tool equipped with a spring biased general hold down in accordance with the present invention.

FIG. 6 illustrates a second embodiment of the inventive dual spring hold down mechanism, which is generally indicated at 121. The hold down mechanism 121 will not be described in detail, since it is similar in most particulars to the hold down mechanism 61. In the hold-down mechanism 121, the U-shaped hold down bar 81 is replaced by a pair of straps 122 which are pivotably attached to a respective pair of bracket arms 123. A cross plate 124 extends between the tops of the straps 122. A hold down pressure bar 125 is attached to and extends between terminal ends of both of the straps 122, with either the straps, as shown in FIG. 6, or the bar 125, providing hold down pressure on a wood panel. In FIG. 6, the straps 122 are providing hold down pressure against a wood panel 131 being cut by a tool 132. A threaded rod 133 with a pair of coil springs 134 and 135 and a cylindrical sleeve 141 provide the identical functions for the hold down mechanism 121 as the equivalent components do for the hold down mechanism 61.

While the hold down mechanisms 61 and 121 have been illustrated and described in a preferred embodiment, numerous variations will occur to one of ordinary skill in the art. For example, the shape of the hold down bar 81, the pressure bar 125, the relative positions of the coil springs 101 and 104, etc. can all be varied to a great degree and still accomplish the stated objectives of the invention. Use of the inventive hold down mechanisms 61 and 121 is not to be considered limited to that of the listed wood working tools. It is thus to be understood that while certain forms of the present invention have been illustrated and described herein, it is not to be limited to the specific forms or arrangement described and shown.

We claim:

1. In a hold down for a wood working table with a rotary wood working tool, the hold down including a bracket which is attachable to the table behind the rotary wood working tool with a bracket extension arm extending outward therefrom and a hold down bar which is pivotable relative to the bracket, the hold down bar including a hold down cross plate positioned proximate the bracket extension arm, a rod threaded into a bore in the bracket extension arm and extending through a slot in the hold down cross plate, the improvement comprising:

a. said rod and said slot are sized and configured to allow said hold down bar to drop relative to the bracket extension arm;

b. a first coil spring surrounding said rod above said hold down cross plate; and c. a second coil spring surrounding said rod above said hold down cross plate, wherein d. said second coil spring is stronger than said first coil spring such that initial lifting of said hold down bar to a hold down height is against the bias of said first coil spring and further lifting of said hold down bar above said hold down height is against the bias of said second coil spring.

2. The improvement of claim 1, and further comprising:
   a. a sleeve surrounding said first coil spring, wherein said first coil spring extends to an extended length longer than said sleeve when said hold down bar drops and said first coil spring retracts to a retracted length such that it fits within said sleeve when said hold down bar is lifted to said hold down height; said extended length to which said first coil spring extends beyond said sleeve when said hold down bar drops relative to the bracket being equal to said hold down height.

3. The improvement of claim 1, and further comprising:
   a. a shoe attached to and extending outward from said hold down bar in a direction from which wood panels are fed into said wood working tool, said shoe being angled upward such that a wood panel being fed into the tool hits the angled shoe and lifts the attached hold down bar.

4. The improvement of claim 1, wherein said hold down height is adjustable by turning said rod to raise or lower it relative to said bracket extension arm.

5. The improvement of claim 1, wherein said hold down bar is a U-shaped bar which surrounds the rotary tool.

6. The improvement of claim 1, wherein said hold down bar includes a hold down press bar attached to a pair of straps with the straps being positioned on respective sides of the rotary tool and being pivotable relative to the bracket.

7. The improvement of claim 1, and further comprising:
   a. a depth stop rod threaded through a threaded bore in said hold down cross plate and extending downward therefrom, said depth stop rod being adjustable to limit the extent which said hold down bar can drop by contacting said bracket arm at that point.

8. A mechanism for allowing a hold down bar to act as both a hold down and a safety barrier, said hold down bar being pivotable relative to a bracket attached to a wood working table, the bracket including an extension arm and the hold down bar including a hold down cross plate positioned above the bracket extension arm, said mechanism comprising:
   a. a rod threaded into a threaded bore in said bracket extension arm and extending upward and through a slot in said hold down cross plate, said rod and said slot being sized and configured to allow said hold down bar to pivot downward when no wood panel is present;
   b. a first coil spring surrounding said rod above said hold down cross plate;
   c. a second coil spring surrounding said rod above said hold down cross plate, wherein
   d. said second coil spring is stronger than said first coil spring such that initial lifting of said hold down bar to a hold down height is against the bias of said first coil spring and further lifting of said hold down bar above said hold down height is against the bias of said second coil spring.

9. The improvement of claim 8, and further comprising:
   a. a sleeve surrounding said first coil spring, wherein said first coil spring extends to an extended length longer than said sleeve when said hold down bar drops and said first coil spring retracts to a retracted length such that it fits within said sleeve when said hold down bar is lifted to said hold down height; said extended length to which said first coil spring extends beyond said sleeve when said hold down bar drops relative to said bracket being equal to said hold down height.

10. The mechanism of claim 8, and further comprising:
    a. a shoe attached to and extending outward from said hold down bar in a direction from which wood panels are fed into said wood working tool, said shoe being angled upward such that a wood panel being fed into the tool hits the angled shoe and lifts the attached hold down bar.

11. The mechanism of claim 8, wherein said hold down height is adjustable by turning said rod to raise or lower it relative to said bracket extension arm.

12. The improvement of claim 8, and further comprising:
    a. a depth stop rod threaded through a threaded bore in said hold down cross plate and extending downward therefrom, said depth stop rod being adjustable to limit the extent which said hold down bar can drop by contacting said bracket arm at that point.

13. In a hold down for a wood working table with a rotary wood working tool, the hold down including a bracket which is attachable to the table behind the rotary wood working tool with a bracket extension arm extending outward therefrom and a hold down bar which is pivotable relative to the bracket, the hold down bar including a hold down cross plate positioned proximate the bracket extension arm, a rod threaded into a bore in the bracket extension arm and extending through a slot in the hold down cross plate, the improvement comprising:
    a. said rod and said slot are sized and configured to allow said hold down bar to drop relative to the bracket extension arm;
    b. a first coil spring surrounding said rod above said hold down cross plate; and
    c. a second coil spring surrounding said rod above said hold down cross plate, wherein
    d. said second coil spring is considerably stronger than said first coil spring such that initial lifting of said hold down bar to a hold down height is against the bias of said first coil spring and further lifting of said hold down bar above said hold down height is against the bias of said second coil spring;
    e. a sleeve surrounding said first coil spring, wherein said first coil spring extends to a length longer than said sleeve when said hold down bar drops and retracts to a length such that it fits within said sleeve when said hold down bar is lifted to said hold down height;
    f. a washer surrounding said rod proximate said sleeve and said first coil spring, an outer diameter of said washer being larger than an inner diameter of said sleeve; and
    g. said second coil spring is positioned above said washer on a side opposite said sleeve.

14. A mechanism for allowing a hold down bar to act as both a hold down and a safety barrier, said hold down bar being pivotable relative to a bracket attached to a wood working table, the bracket including an extension arm and the hold down bar including a hold down cross plate positioned above the bracket extension arm, said mechanism comprising:
    a. a rod threaded into a bore in said bracket extension arm and extending upward and through a slot in said hold down cross plate, said rod and said slot being sized and configured to allow said hold down bar to pivot downward when no wood panel is present;
    b. a first coil spring surrounding said rod above said hold down cross plate;

c. a second coil spring surrounding said rod above said hold down cross plate, wherein d. said second coil spring is considerably stronger than said first coil spring such that initial lifting of said hold down bar to a hold down height is against the bias of said first coil spring and further lifting of said hold down bar above said hold down height is against the bias of said second coil spring;

e. a sleeve surrounding said first coil spring, wherein said first coil spring extends to a length longer than said sleeve when said hold down bar drops and retracts to a length such that it fits within said sleeve when said hold down bar is lifted to said hold down height;

f. a washer surrounding said rod above said sleeve and said first coil spring, an outer diameter of said washer being larger than an inner diameter of said sleeve; and g. said second coil spring is positioned above said washer.

15. A hold down mechanism for a wood working table comprising:

a. a bracket securable to the wood working table and having an extension arm extending forward therefrom across said wood working table;

b. a hold down bar pivotally secured to said bracket and pivotal toward and away from a support surface of said wood working table; said hold down bar including a hold down cross plate extending across said extension arm of said bracket;

c. a rod securable at a first end to a first of said extension arm and said hold down cross plate and slidably mounted relative to a second of said extension arm and said hold down cross plate;

d. first and second coil springs surrounding said rod in axial alignment; said first and second coil springs resisting pivoting of said hold down bar away from said wood working surface; said second coil spring being stronger than said first coil spring, such that initial lifting of said hold down bar to a hold down height is against the bias of said first coil spring and further pivoting of said hold down bar beyond said hold down height is against the bias of said second coil spring.

16. The hold down mechanism as in claim 15 further comprising:

a. a sleeve surrounding said first coil spring, wherein said first coil spring extends to an extended length longer than said sleeve when said hold down bar pivots into abutting relationship with said support surface and said first coil spring retracts to a retracted length such that it fits within said sleeve when said hold down bar is lifted to said hold down height; said extended length to which said first coil spring extends beyond said sleeve when said hold down bar pivots toward said support surface being equal to said hold down height.

17. The hold down mechanism as in claim 16 further comprising:

a. a washer surrounding said rod above said sleeve and said first coil spring, an outer diameter of said washer being larger than an inner diameter of said sleeve; and b. said second coil spring is positioned above said washer.

* * * * *